US010617237B2

(12) United States Patent
Pan (10) Patent No.: US 10,617,237 B2
(45) Date of Patent: Apr. 14, 2020

(54) SELF-CHECKOUT METHOD AND SYSTEM THEREOF

(71) Applicant: Wistron Corporation, New Taipei (TW)

(72) Inventor: Chien-Ming Pan, New Taipei (TW)

(73) Assignee: Wistron Corporation, New Taipei (TW)

( * ) Notice: Subject to any disclaimer, the term of this patent is extended or adjusted under 35 U.S.C. 154(b) by 71 days.

(21) Appl. No.: 15/978,185

(22) Filed: May 13, 2018

(65) Prior Publication Data

US 2019/0231094 A1 Aug. 1, 2019

(30) Foreign Application Priority Data

Jan. 31, 2018 (TW) ................ 107103383 A (51) Int. Cl.
G07G 1/00 (2006.01)
A47F 9/04 (2006.01)
G06K 9/00 (2006.01)
G06Q 20/20 (2012.01)
G06K 9/46 (2006.01)

(52) U.S. Cl.
CPC .......... *A47F 9/048* (2013.01); *G06K 9/00664* (2013.01); *G06K 9/00671* (2013.01); *G06K 9/4652* (2013.01); *G06Q 20/208* (2013.01); *G06K 2209/17* (2013.01)

(58) Field of Classification Search
None
See application file for complete search history.

(56) References Cited

U.S. PATENT DOCUMENTS

| 4,676,343 | A | * | 6/1987 | Humble | A47F 9/047 |
| | | | | | 177/50 |
| 5,543,607 | A | * | 8/1996 | Watanabe | A47F 9/048 |
| | | | | | 186/61 |
| 8,571,298 | B2 | * | 10/2013 | McQueen | G06K 9/00 |
| | | | | | 235/378 |
| 9,378,397 | B2 | * | 6/2016 | Cherry | G06K 7/01 |
| 2012/0187194 | A1 | * | 7/2012 | Svetal | G07G 1/0045 |
| | | | | | 235/470 |

(Continued)

FOREIGN PATENT DOCUMENTS

| CN | 204614025 U | 9/2015 |
| CN | 106355790 A | 1/2017 |
| TW | M503621 U | 6/2015 |

*Primary Examiner* — Christle I Marshall
(74) *Attorney, Agent, or Firm* — Winston Hsu (57) ABSTRACT

A self-checkout method includes an image recognizing system performing a first recognition process on at least a product placed on a checkout conveyor to obtain an item information corresponding to the at least a product from a product database; performing a second recognition process for positioning a first product of the at least a product to determine a position of the first product relative to the checkout conveyor when the image recognizing system fails to recognize the first product based on the first recognition process; controlling an indicating light to markedly label the first product when the position of the first product is determined, and stopping running the checkout conveyor; and resuming running the checkout conveyor after the first product is removed or when no product cannot be recognized by the first recognition process.

26 Claims, 4 Drawing Sheets

(56) References Cited

U.S. PATENT DOCUMENTS

2013/0020391 A1\* 1/2013 Olmstead ........... G06K 7/10722
235/438
2017/0083884 A1\* 3/2017 Vilmosh .............. G06K 9/6202

\* cited by examiner

SELF-CHECKOUT METHOD AND SYSTEM THEREOF

BACKGROUND OF THE INVENTION

1. Field of the Invention

The present invention relates to a self-checkout method and system thereof, and more particularly, to a self-checkout method and system thereof based on image recognition.

2. Description of the Prior Art

With the advancement and improvement of technology, all kinds of automated or self-service electronic devices are provided to reduce manpower and cost of human resources, which has become a major trend of the technology. A major technology of conventional self-checkout is that a user utilizes a barcode scanner or radio frequency identification (RFID) to respectively read product information and perform a checkout operation. However, the conventional barcode scanner must respectively align a barcode of each product to perform the checkout operation, which not only extends a checkout time period, but also causes inconveniences to the user when the barcode scanner cannot correctly read the product information. Although the RFID may read multiple product information at a time, whereas, under the circumstance, each product needs to be equipped with an RFID tag, which results in significant increment on the cost, and therefore, the RFID may not be feasible to be implemented in the conventional self-checkout system. Thus, an improvement over the conventional self-checkout system is necessary.

SUMMARY OF THE INVENTION

Therefore, the present invention provides a self-checkout method and system thereof based on the image recognition, so as to improve the conveniences of the self-checkout and provide a better usage scenario for the user.

The present invention discloses a self-checkout method, comprising an image recognizing system performing a first recognition process on at least a product placed on a checkout conveyor to obtain an item information corresponding to the at least a product from a product database; performing a second recognition process for positioning a first product of the at least a product to determine a position of the first product relative to the checkout conveyor when the image recognizing system fails to recognize the first product based on the first recognition process; controlling an indicating light to markedly label the first product when the position of the first product is determined, and stopping running the checkout conveyor; and resuming running the checkout conveyor after the first product is removed or when no product cannot be recognized by the first recognition process.

The present invention further discloses a self-checkout system, comprising a checkout conveyor, configured to convey at least a product; an image recognizing system, configured to perform a first recognition process on the at least a product placed on the checkout conveyor to obtain an item information corresponding to the at least a product from a product database and to perform a second recognition process for positioning a first product of the at least a product when the image recognizing system fails to recognize the first product based on the first recognition process; an indicating light, configured to selectively emit a visible light onto the checkout conveyor; and a controller, coupled to the checkout conveyor, the image recognizing system and the indicating light, configured to control the indicating light to markedly label the first product when the position of the first product is determined and stop running the checkout conveyor, and resume running the checkout conveyor after the first product is removed or when no product cannot be recognized.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
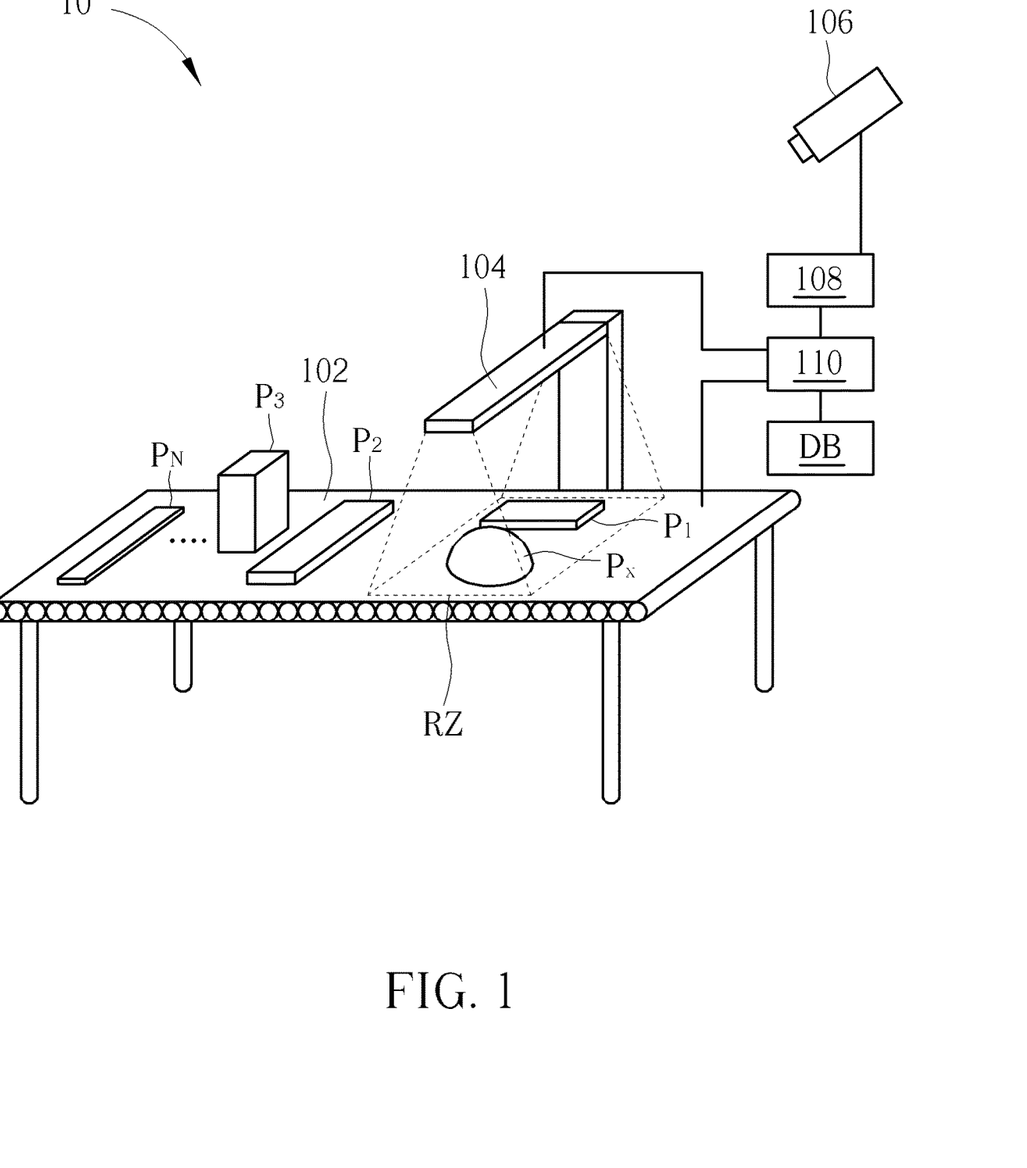
FIG. 1 is a schematic diagram of a self-checkout system according to an embodiment of the present invention.

Please refer to FIG. 1, which is a schematic diagram of a self-checkout system 10 according to an embodiment of the present invention. The self-checkout system 10 includes a checkout conveyor 102, an indicating light 104, an image capturing device 106, an image recognition unit 108, a controller 110 and a product database DB. The self-checkout system 10 may be cashier devices in a shop, and combined with an image recognizing system to have a function of product image recognition. A user may place products P1-PN on the checkout conveyor 102 (wherein N of the products P1-PN may be any integer number to represent N pieces of products), so as to perform the self-checkout when running the checkout conveyor 102, reduce requirements of human resources and improve efficiency. The image capturing device 106 is utilized for capturing exterior images of one or more of the products P1-PN placed on the checkout conveyor 102, when entering a recognizing zone, and after then, the image recognition unit 108 performs a first recognition process. In an embodiment, the self-checkout system 10 may define a fixed recognizing zone RZ on the checkout conveyor 102, when one or more of the products P1-PN on the checkout conveyor 102 whichever enters the recognizing zone RZ, the image recognition system may, at a time, capture and recognize the one or more products in the recognizing zone RZ simultaneously. Therefore, the user may not need to intentionally look for barcodes on the products P1-PN to respectively align and scan the barcodes on the products P1-PN with a barcode scanner. When the image recognition system fails to recognize any product Px of the products P1-PN based on the first recognition process, the image recognition system recognizes the product Px based on a second recognition process for recognizing a position of the product Px. That is, when the controller 110 determines an absolute position of the product Px by a relative position of the product Px to the recognizing zone RZ, the controller 110 controls the indicating light 104 to label the product Px and stop running the checkout conveyor 102. And when the product Px is removed and no product cannot be successfully recognized in the recognizing zone RZ, the checkout conveyor 102 is re-started. The first recognition process of the image recognition system stated above may be a color image recognition method and the second recognition process may be a grayscale image recognition method. One of reasons for adopting the grayscale image recognition method is to label the relative position of a shape of the product in the recognizing zone RZ, rather than exactly recognizing pictures/words on a surface of the product when positioning the product, so as to significantly reduce a computing loading of recognition and increase a positioning speed. However, in other embodiments of the present invention, it is not excluded that the second recognition process also adopts the color image recognition method; that is, the present invention may only adopt the color image recognition method. Even in other embodiments of the present invention, it is not excluded that the first recognition process adopts the grayscale image recognition method to recognize the exterior of the products. All in all, the first recognition process is utilized for recognizing item information of shape, picture, word details, etc. on the product exterior, and the second recognition process is utilized for recognizing the position of the products. As such, the self-checkout system 10 performs the first recognition process for the exterior image of the product P captured by the image capturing device 106, which is taken as a base to determine the item information of the product, and when the first recognition process fails to recognize the product Px, the self-checkout system 10 performs the second recognition process on label the product Px with the indicating light 104 to inform the user of removing the product Px, which cannot be recognized, so as to continue to perform the self-checkout smoothly.

The example stated above briefly illustrates that the self-checkout system of the present invention utilizes the image recognition system to recognize the item information and the position of the products, so as to improve the conveniences of the self-checkout performed by the user. Notably, those skilled in the art may make proper modifications to the self-checkout system according to different system requirements. For example, according to different requirements, an amount of the image capturing device of the self-checkout system may be increased, or the way to label the product when the image recognition system fails to recognize the product is not limited to illuminate the product, but may also be achieved by other methods of sound, light, vibration or so. The above mentioned embodiments may be modified according to indications of a user or a manufacturer, or settings of a computer system, and not limited thereto, which all belongs to the scope of the present invention.

Figure 2:
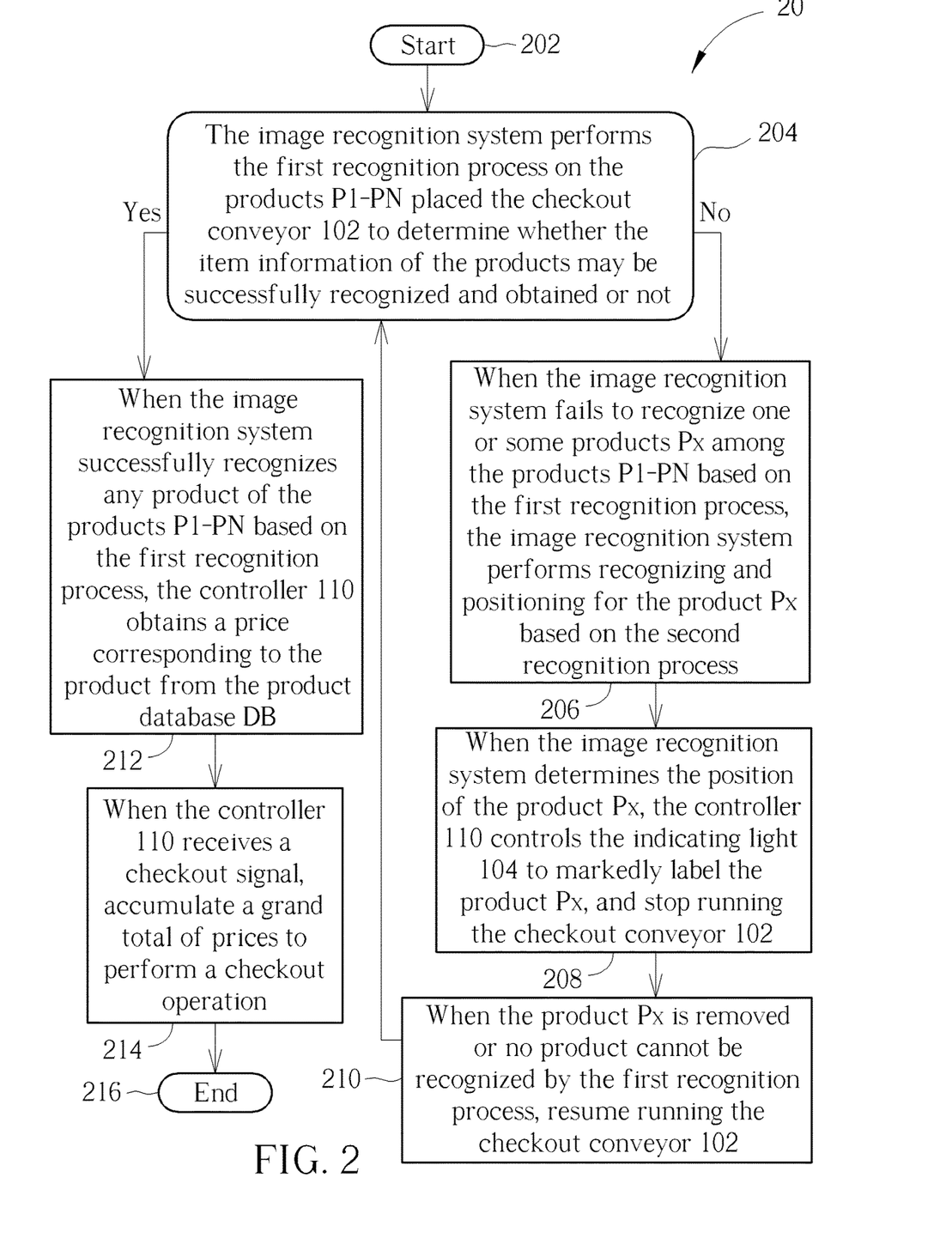
FIG. 2 is a schematic diagram of a self-checkout process according to an embodiment of the present invention.

Please continue to refer to FIG. 2, which is a schematic diagram of a self-checkout process 20 according to an embodiment of the present invention. The self-checkout process 20 may be applied to the self-checkout system 10, so as to provide the self-checkout for the user, the self-checkout process 20 includes the following steps:

Step 202: Start.

Step 204: The image recognition system performs the first recognition process on the products P1-PN placed the checkout conveyor 102 to determine whether the item information of the products may be successfully recognized and obtained or not.

Step 206: When the image recognition system fails to recognize one or some products Px among the products P1-PN based on the first recognition process, the image recognition system performs recognizing and positioning for the product Px based on the second recognition process.

Step 208: When the image recognition system determines the position of the product Px, the controller 110 controls the indicating light 104 to markedly label the product Px, and stop running the checkout conveyor 102.

Step 210: When the product Px is removed or no product cannot be recognized by the first recognition process, resume running the checkout conveyor 102.

Step 212: When the image recognition system successfully recognizes any product of the products P1-PN based on the first recognition process, the controller 110 obtains a price corresponding to the product from the product database DB.

Step 214: When the controller 110 receives a checkout signal, accumulate a grand total of prices to perform a checkout operation.

Step 216: End.

As can be known from the above, the self-checkout process 20 may effectively and conveniently help the user when performing the self-checkout. In an embodiment, when the user places the products P1-PN on the checkout conveyor 102, and the products P1-PN sequentially enter the recognizing zone RZ by the checkout conveyor 102. In the meanwhile, in step 204, the image recognition system determines whether each of the item information of the products P1-PN in the recognizing zone RZ can be recognized successfully or not. If not, execute step 206; that is, when the image recognition system fails to recognize the product Px of the products P1-PN based on the first recognition process, the image recognition system recognizes the product Px based on the second recognition process for recognition and positioning.

Figure 3:
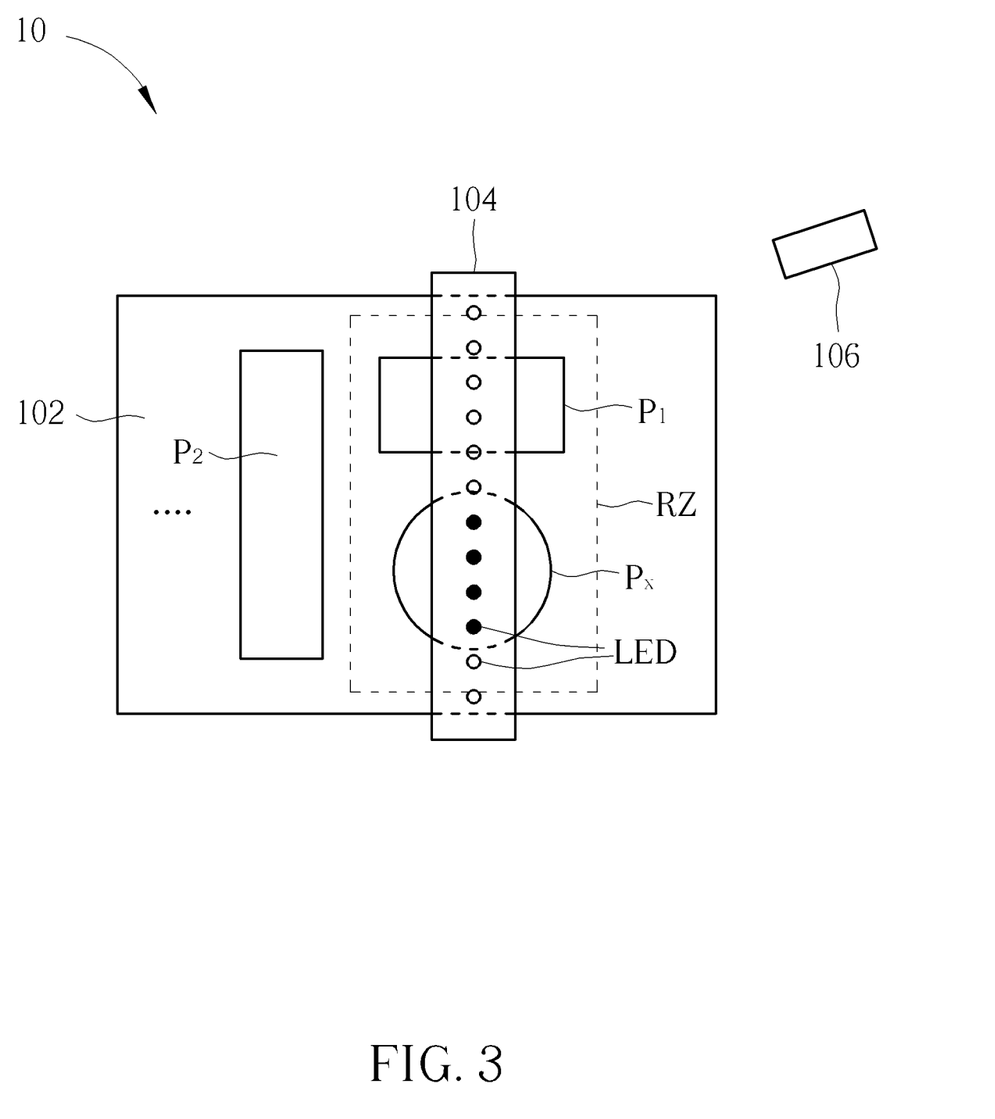
FIG. 3 is a schematic diagram of a top view of the self-checkout system according to an embodiment of the present invention.

In an embodiment, when the image recognition system performs the second recognition process, the image recognition system may determine the position of the product Px according to a relative relation of the product Px in the recognizing zone RZ. For example, please refer to FIG. 3, which is a schematic diagram of a top view of the self-checkout system 10 according to an embodiment of the present invention. As shown in FIG. 3, when the image capturing device 106 fails to recognize the product Px based on the first recognition process, the image recognition system adopts the second recognition process to recognize and obtain the relative relation of an image of the product Px in the recognizing zone RZ, and the controller 110 may determine the absolute position of the product Px. Further, since a position of the indicating light 104 is fixed and located above the recognizing zone RZ, the controller 110 acquaints with the relative position of the indicating light 104 to the recognizing zone RZ, and therefore, the controller 110 determines the absolute position of the indicating light 104.

In step 208, when the image recognition system determines the position of the product Px, the controller 110 labels the product Px according to the determined position of the product Px by the image recognition system, and stops running the checkout conveyor 102. In an embodiment, the controller 110 emits a visible light to focus on or flash at the position of the product Px and markedly label the product Px by the indicating light 104. Or the controller 110 moves the product Px into an illumination range of the indicating light 104 by the checkout conveyor 102, so as to markedly label the product Px, and to indicate to the user to remove or flip the product Px. That is, when the user is in the process of the self-checkout, and the image recognition system cannot successfully recognize the product Px, the indicating light 104 illuminates the unrecognizable product Px, so as to inform the user of removing or flipping the product Px, or inform the user of checking whether the product Px is impaired or not, which causes a malfunction of the first recognition process (i.e. recognition of the item information of the product). Then, in step 210, after the product Px is removed or flipped, the controller 110 resumes running the checkout conveyor 102 when no unrecognizable product is found, and then back to step 204 to perform the first recognition process on the following products. Notably, in an embodiment, the indicating light 104 is composed of a plurality of light-emitting diode (LED) lights in a row or multiple rows. Take the embodiment shown in FIG. 3 as an example, the indicating light 104 is composed of 12 LED lights in one row. When the image recognition system determines the position of the product Px, the controller 110 turns on the $7^{th}$-$10^{th}$ LED lights (i.e. the $7^{th}$-$10^{th}$ LED lights from top to down in FIG. 3) corresponding to a projection area of the product Px, according to the position of the product Px, so as to markedly label the unrecognizable product Px based on the first recognition process. However, types to implement the indicating light 104 are not limited thereto, other types of indicating light, such as, a projection light, which can rotate an illumination direction, may also be applied to the present invention.

The above mentioned steps of process are executed when the image recognition system of the self-checkout system 10 cannot successfully recognize the product Px. In contrast, when the image capturing device 106, in step 204, successfully recognizes the products P1-PN based on the first recognition process, the self-checkout process 20 undergoes step 212. In step 212, the controller 110 obtains the prices corresponding to the products P1-PN from the product database DB. In other words, the controller 110 obtains the price of the product from the corresponding item information after recognizing any product of the products P1-PN, according to the item information of a product title, manufacturer, shape, color, size, material, price, exterior image, etc. of each of the products P1-PN stored in the product database DB. In another embodiment, the image recognition system may recognize multiple products at the same time, so as to improve the efficiency of the self-checkout, which is not limited thereto.

Finally, when the image recognition system successfully recognizes all of the products P1-PN based on the first recognition process, in step 214, the controller 110 accumulates the grand total of prices of all of the products P1-PN to perform the checkout operation in respond to receiving the checkout signal. The checkout signal may be generated by different ways. In an embodiment, the checkout signal may be generated by a timer, for example, after the prices of one, more or all of the products P1-PN are successfully recognized based on the first recognition process, e.g. in 5 seconds, without any product entering the recognizing zone RZ, the checkout signal is sent out according the timer to the controller 110, representing that a batch of products are recognized, and therefore, the controller 110 accumulates the grand total of prices and performs the checkout operation. In another embodiment, a specific indicator of rod-like stick, such as a checkout lane divider, may be placed on the checkout conveyor behind the products, and when the specific indicator enters the recognizing zone RZ and is recognized or detected by a detector, the checkout signal is generated to inform the controller 110 to perform the checkout operation. In another embodiment, a physical button or a touch screen is provided to be touched by the user, so as to generate the checkout signal. As such, the self-checkout system 10 of the present invention may be integrated with the conventional cashier software and hardware, such that the image recognition system determines the price of each of the products P1-PN, and indicates to the user to remove the unrecognizable product Px when the image recognition system cannot successfully recognize the product Px, so as to improve the conveniences of the self-checkout and the usage scenario.

The above mentioned product database DB may be a local terminal or a cloud terminal for storing the product information, and the controller 110 may obtain the price of each of the products P1-PN from the product database DB according to results of the recognition process, so as to accumulate the grand total of the prices of all of the products P1-PN, and control to run or stop the checkout conveyor 102, or control the indicating light 104 to label the product Px which cannot be successfully recognized based on the first recognition process. Notably, in another embodiment, the product database DB and the controller 110 may be further integrated with the image capturing device 106 and the image recognition unit 108 as one image recognition system.

Figure 4:
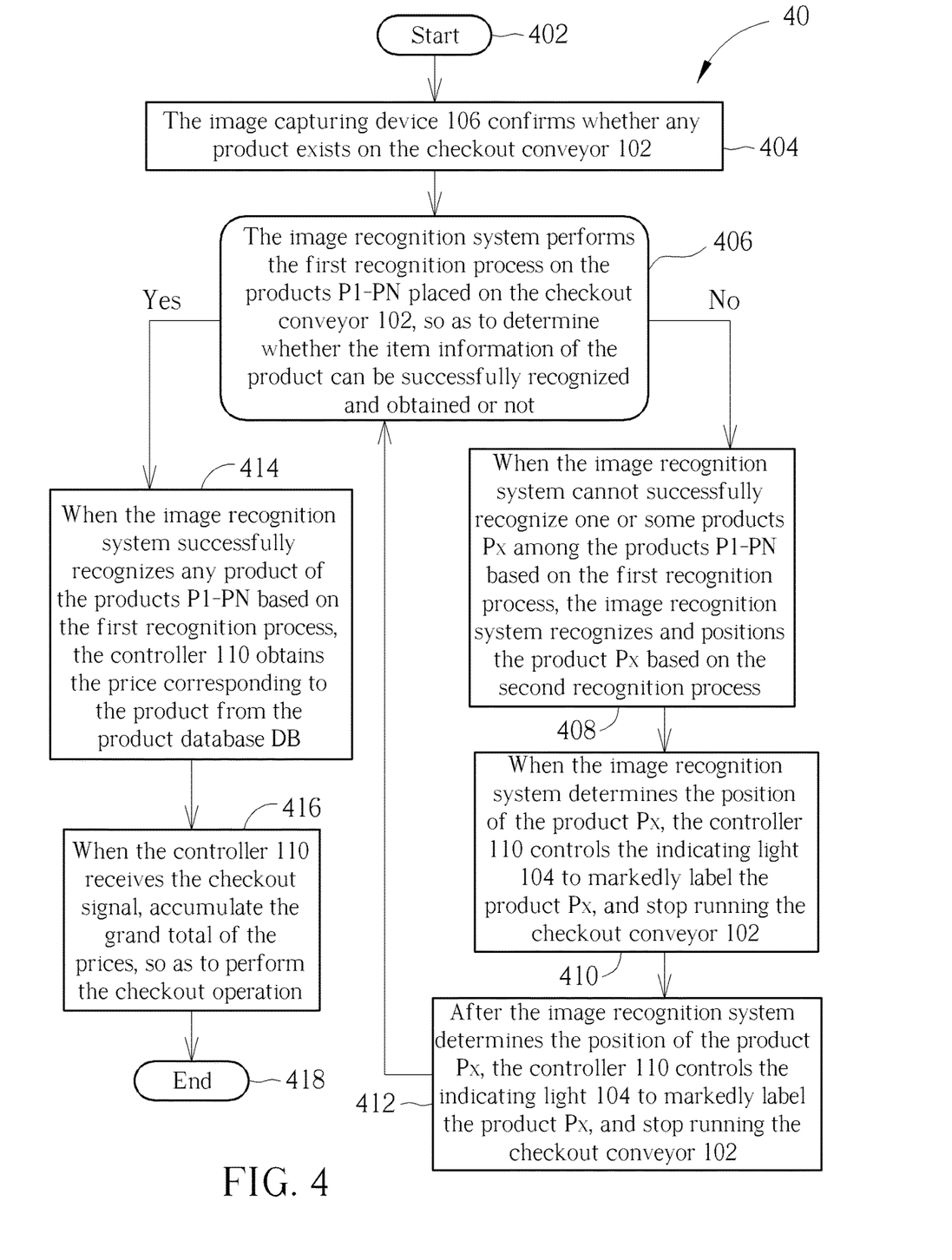
FIG. 4 is a schematic diagram of another self-checkout process according to an embodiment of the present invention.

According to different applications or design concepts, the self-checkout system 10 may be implemented with all kinds of methods. For example, please refer to FIG. 4, which is a schematic diagram of another self-checkout process 40 according to an embodiment of the present invention. The self-checkout process 40 may be practically applied to the shop, and provided to the user for performing the self-checkout. The self-checkout process 40 includes the following steps:

Step 402: Start.

Step 404: The image capturing device 106 confirms whether any product exists on the checkout conveyor 102.

Step 406: The image recognition system performs the first recognition process on the products P1-PN placed on the checkout conveyor 102, so as to determine whether the item information of the product can be successfully recognized and obtained or not.

Step 408: When the image recognition system cannot successfully recognize one or some products Px among the products P1-PN based on the first recognition process, the image recognition system recognizes and positions the product Px based on the second recognition process.

Step 410: When the image recognition system determines the position of the product Px, the controller 110 controls the indicating light 104 to markedly label the product Px, and stop running the checkout conveyor 102.

Step 412: When the product Px is removed or when no product cannot be recognized based on the first recognition process, resume running the checkout conveyor 102.

Step 414: When the image recognition system successfully recognizes any product of the products P1-PN based on the first recognition process, the controller 110 obtains the price corresponding to the product from the product database DB.

Step 416: When the controller 110 receives the checkout signal, accumulate the grand total of the prices, so as to perform the checkout operation.

Step 418: End.

Different with the above mentioned self-checkout process 20 in FIG. 2, in step 404 of the self-checkout process 40, before the image recognition system recognizes the products P1-PN based on the first recognition process, the image recognition system confirms whether any product exists on the checkout conveyor 102 or not, so as to determine whether to activate the self-checkout process 20 in FIG. 2 or not. Therefore, according to the self-checkout process 40, it is not necessary to additionally activate the steps of the self-checkout before the user executes the self-checkout, but the user only needs to place the products on the checkout conveyor 102 to activate the self-checkout, so as to improve the usage scenario when the user executes the self-checkout.

Notably, the embodiment stated above illustrates the concept of the present invention, those skilled in the art may make proper modifications to the present invention according to different system requirements, and not limited thereto. According to different applications and design concepts, the self-checkout system 10 may be implemented in all kinds of methods. In an embodiment, multiple image capturing devices 106 may be deployed on the self-checkout system 10, so as to aim at the recognizing zone RZ from different places, which avoids a dead space and improves the efficiency of the image recognition and the self-checkout, for example, individually mounting one image capturing device 106 at top, front and back of the recognizing zone RZ, or mounting multiple image capturing devices 106 on a vertical plane of the recognizing zone RZ relative to checkout conveyor 102 on a door frame or a tunnel structure track. Or a three-dimensional (3D) image capturing device may be adopted to recognize the products P1-PN, so as to correctly recognize the products P1-PN, when the products P1-PN are in an abnormal status (e.g. tilted or incomplete package), and improve the accuracy and efficiency of the self-checkout. Or an anti-mistake mechanism may be added to inform the user of reallocating the products P1-PN when the products P1-PN are in the abnormal status (e.g. tilted or incomplete package) by a method of sound, illumination or vibration, which are not limited thereto and all belong to the scope of the present invention.

In summary, the present invention provides a self-checkout method and system thereof, which particularly applies the image recognition to improve the conveniences of the self-checkout and provide a better usage scenario for the user.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A self-checkout method, comprising:
    an image recognizing system performing a first recognition process on at least a product placed on a checkout conveyor to obtain an item information corresponding to the at least a product from a product database;
    performing a second recognition process for positioning a first product of the at least a product to determine a position of the first product relative to the checkout conveyor when the image recognizing system fails to recognize the first product based on the first recognition process;
    controlling an indicating light to markedly label the first product when the position of the first product is determined, and stopping running the checkout conveyor; and
    resuming running the checkout conveyor after the first product is removed or when no product cannot be recognized by the first recognition process.

2. The self-checkout method of claim 1, further comprising:
    obtaining a price corresponding to the first product from the product database when the image recognizing system successfully recognizes the first product based on the first recognition process; and
    in response to receiving a checkout signal, accumulating a grand total of prices corresponding to the at least a product before receiving the checkout signal to perform a checkout operation.

3. The self-checkout method of claim 2, wherein when one or more of the at least a product are successfully recognized based on the first recognition process, the checkout signal is sent out according a timer when no other product is recognized after a predetermined time.

4. The self-checkout method of claim 2, wherein the checkout signal is sent out when an indicator on the checkout conveyor is recognized or detected.

5. The self-checkout method of claim 1, wherein a recognizing zone is defined on the checkout conveyor, the image recognizing system performs the first recognition process and the second recognition process on the at least a product whichever entering the recognizing zone.

6. The self-checkout method of claim 1, wherein the first recognition process adopts a color image recognition method and the second recognition process adopts a grayscale image recognition method.

7. The self-checkout method of claim 1, wherein the step of controlling the indicating light to markedly label the first product comprises:
    controlling the indicating light to emit a visible light on the first product.

8. The self-checkout method of claim 7, wherein the step of controlling the indicating light to emit the visible light on the first product comprises:
    rotating a direction of the indicating light to label the first product.

9. The self-checkout method of claim 7, wherein the step of controlling the indicating light to emit the visible light on the first product comprises:
    controlling the checkout conveyor to move and accordingly moving the first product into an illumination range of the indicating light.

10. The self-checkout method of claim 7, wherein the indicating light comprises a plurality of light-emitting diode (LED) lights, and the step of controlling the indicating light to emit the visible light on the first product comprises:
    only turning on one or more of the LED lights corresponding to a projection area of the first product to label the first product.

11. The self-checkout method of claim 1, wherein before the step of the image recognizing system performing the first recognition process on the at least a product placed on the checkout conveyor, the self-checkout method further comprises:
    determining whether the at least a product exits on the checkout conveyor.

12. A self-checkout system, comprising:
    a checkout conveyor, configured to convey at least a product;
    an image recognizing system, configured to perform a first recognition process on the at least a product placed on the checkout conveyor to obtain an item information corresponding to the at least a product from a product database and to perform a second recognition process for positioning a first product of the at least a product when the image recognizing system fails to recognize the first product based on the first recognition process;
    an indicating light, configured to selectively emit a visible light onto the checkout conveyor; and a controller, coupled to the checkout conveyor, the image recognizing system and the indicating light, configured to control the indicating light to markedly label the first product when the position of the first product is determined and stop running the checkout conveyor, and resume running the checkout conveyor after the first product is removed or when no product cannot be recognized.

13. The self-checkout system of claim 12, wherein the product database comprises product images and prices corresponding to multiple products, the controller obtains a price corresponding to the at least a product, after the image recognizing system performs the first recognition process.

14. The self-checkout system of claim 13, wherein in response to receiving a checkout signal, the controller accumulates a grand total of prices corresponding to the at least a product before receiving the checkout signal, to perform a checkout operation.

15. The self-checkout system of claim 14, further comprising a timer, wherein when one or more of the at least a product are successfully recognized based on the first recognition process, the checkout signal is sent out according the timer when no other product is recognized after a predetermined time.

16. The self-checkout system of claim 14, further comprising an indicator placed on the checkout conveyor, wherein the checkout signal is sent out when the indicator is recognized or detected.

17. The self-checkout system of claim 14, wherein a recognizing zone is defined on the checkout conveyor, the image recognizing system performs the first recognition process and the second recognition process on the at least a product entering the recognizing zone.

18. The self-checkout system of claim 17, wherein the first recognition process adopts a color image recognition method and the second recognition process adopts a gray-scale image recognition method.

19. The self-checkout system of claim 12, wherein the controller rotates a direction of the indicating light to label the first product.

20. The self-checkout system of claim 12, wherein the controller controls the checkout conveyor to move and accordingly moves the first product into an illumination range of the indicating light.

21. The self-checkout system of claim 12, wherein the indicating light comprises a plurality of light-emitting diode (LED) lights, and the controller turns on only one or more LED lights corresponding to a projection area of the first product to label the first product.

22. The self-checkout system of claim 17, wherein the image recognizing system comprises at least two image capturing devices to aim at the recognizing zone.

23. A self-checkout method, comprising:
an image recognizing system performing a first recognition process on at least a product placed on a checkout conveyor to obtain an item information corresponding to the at least a product from a product database;
performing a second recognition process for positioning a first product of the at least a product to determine a position of the first product relative to the checkout conveyor when the image recognizing system fails to recognize the first product based on the first recognition process;
controlling an indicating light to markedly label the first product when the position of the first product is determined, and stopping running the checkout conveyor.

24. The self-checkout method of claim 23, further comprising:
resuming running the checkout conveyor after the first product is removed or when no product cannot be recognized by the first recognition process.

25. A self-checkout system, comprising:
a checkout conveyor, configured to convey at least a product;
an image recognizing system, configured to perform a first recognition process on the at least a product placed on the checkout conveyor to obtain an item information corresponding to the at least a product from a product database and to perform a second recognition process for positioning a first product of the at least a product when the image recognizing system fails to recognize the first product based on the first recognition process;
an indicating light, configured to selectively emit a visible light onto the checkout conveyor; and
a controller, coupled to the checkout conveyor, the image recognizing system and the indicating light, configured to control the indicating light to markedly label the first product when the position of the first product is determined and stop running the checkout conveyor.

26. The self-checkout system of claim 25, wherein the controller is configured to resume running the checkout conveyor after the first product is removed or when no product cannot be recognized.

* * * * *